Figure 1:
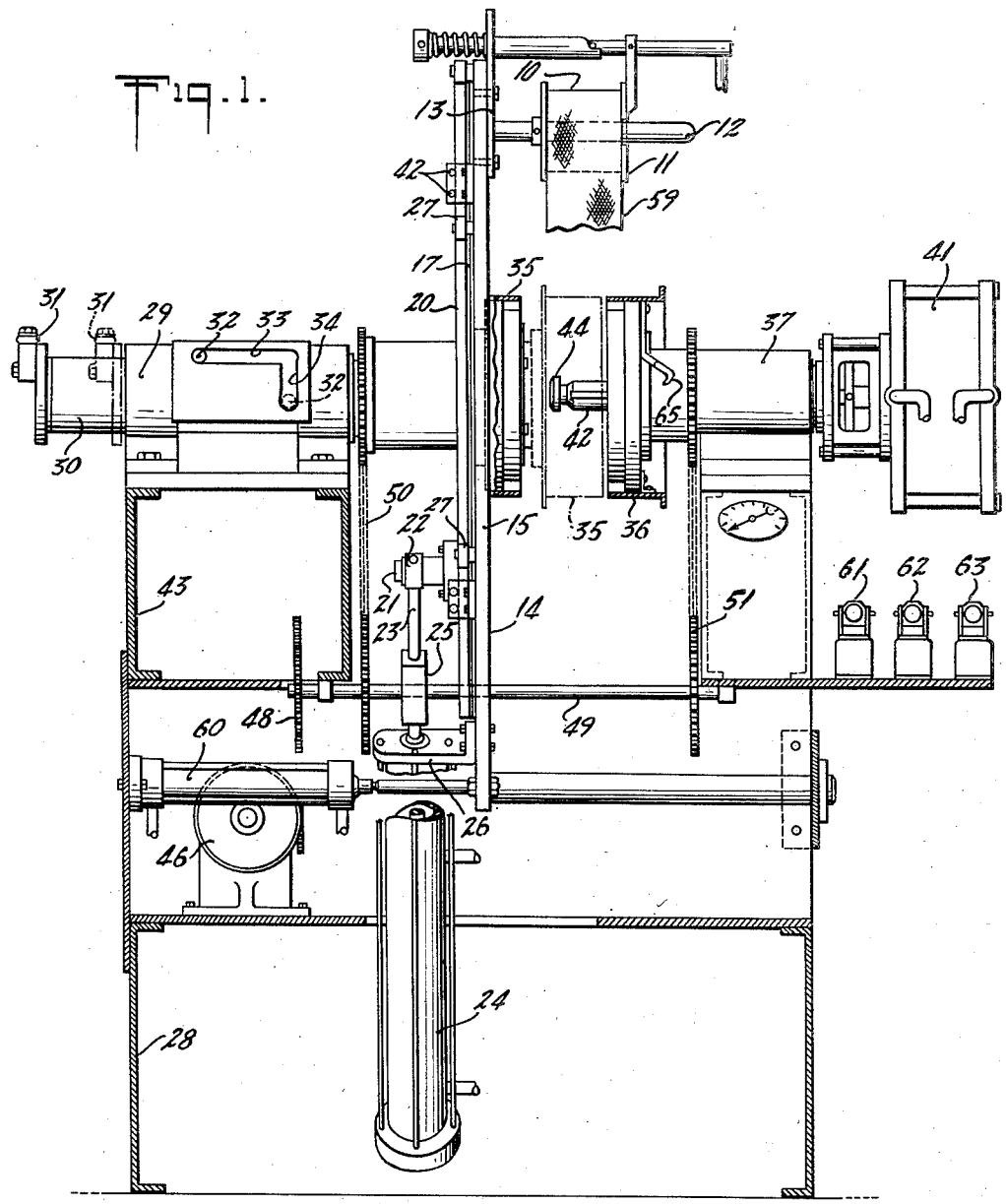

Sept. 1, 1953 L. W. MacFARLAND 2,650,861
MACHINE FOR THE MANUFACTURE OF BUFFS AND SIMILAR ARTICLES
Filed March 25, 1947 5 Sheets-Sheet 1

INVENTOR
LAURENS W. MACFARLAND
BY
ATTORNEY

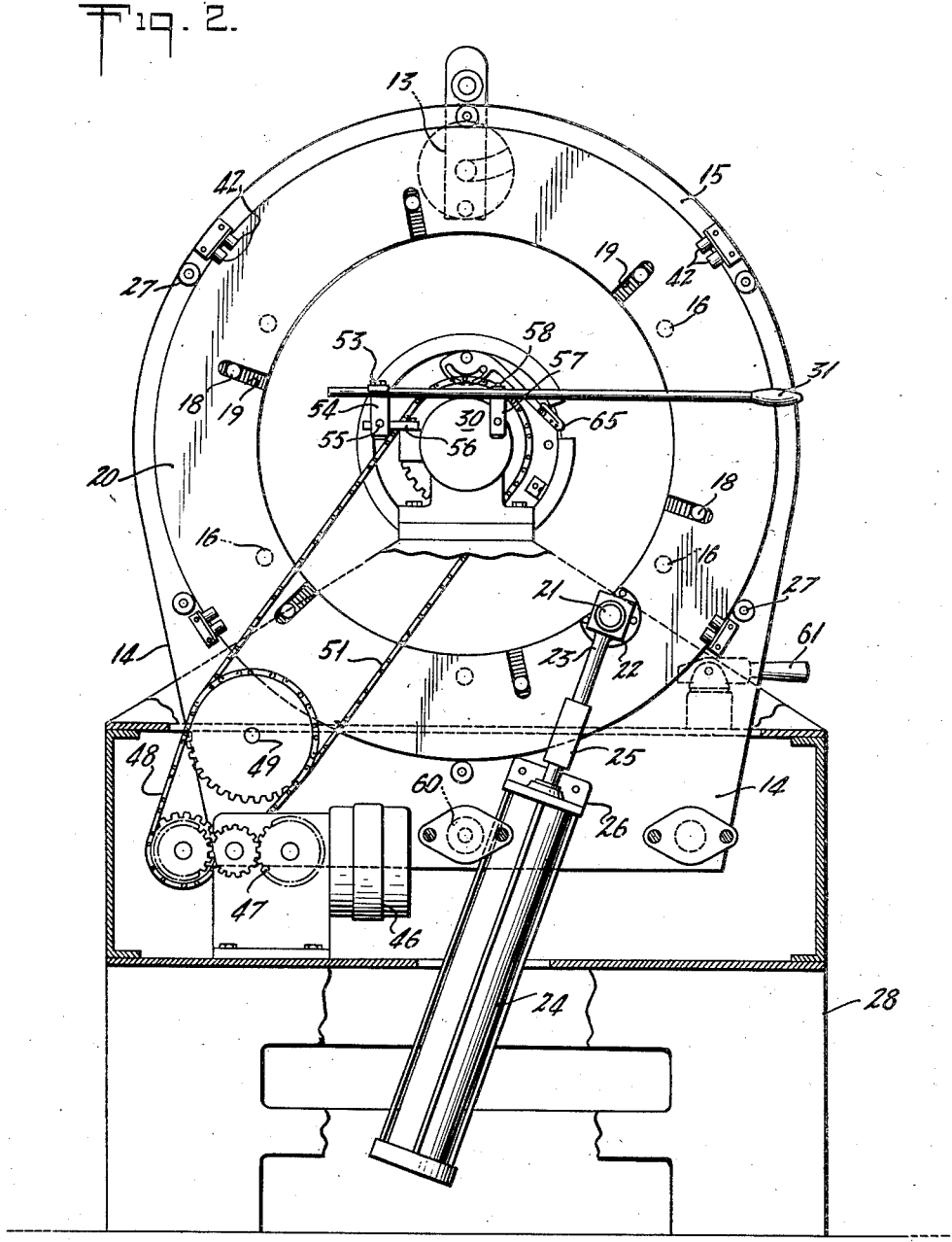

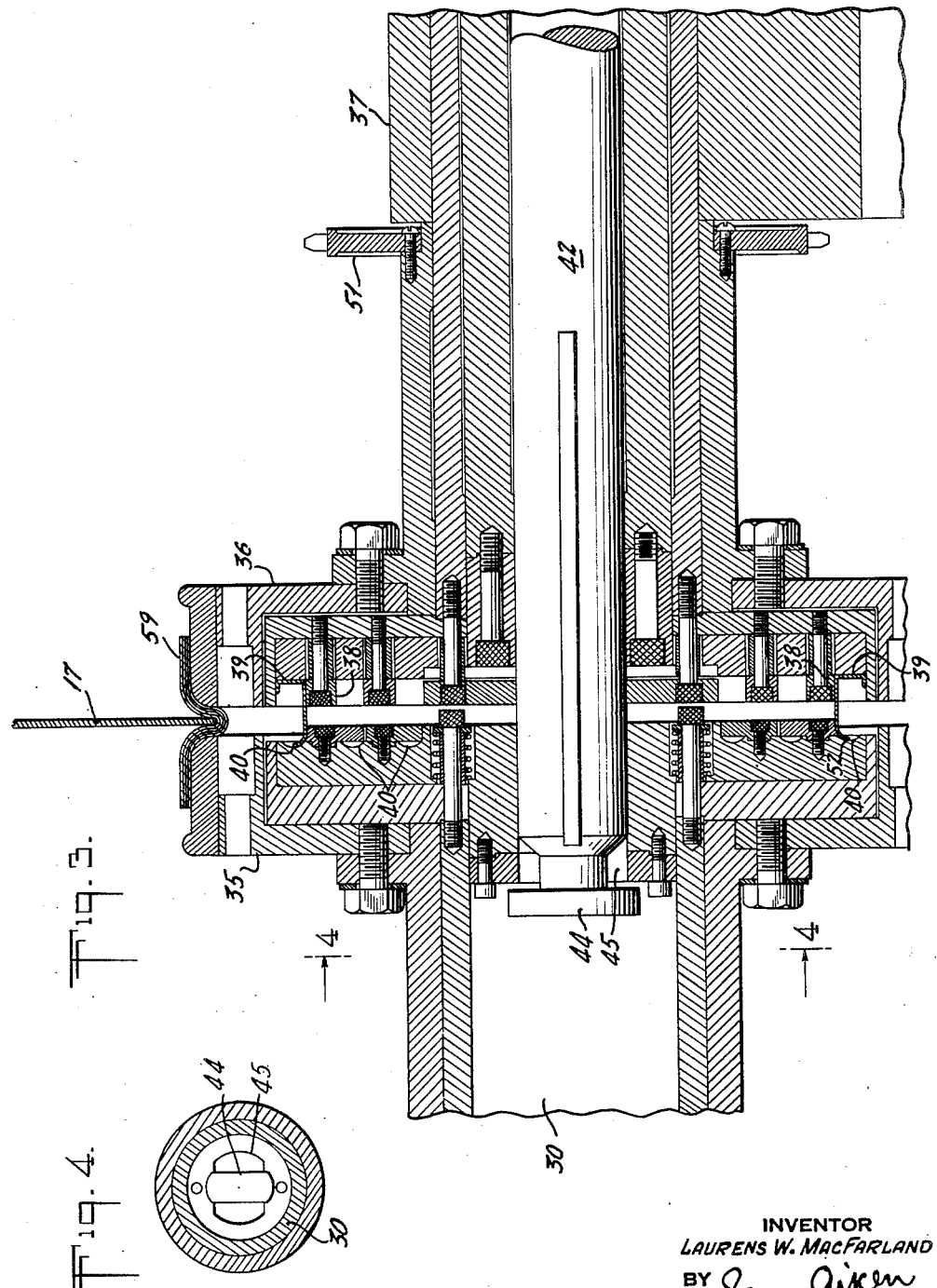

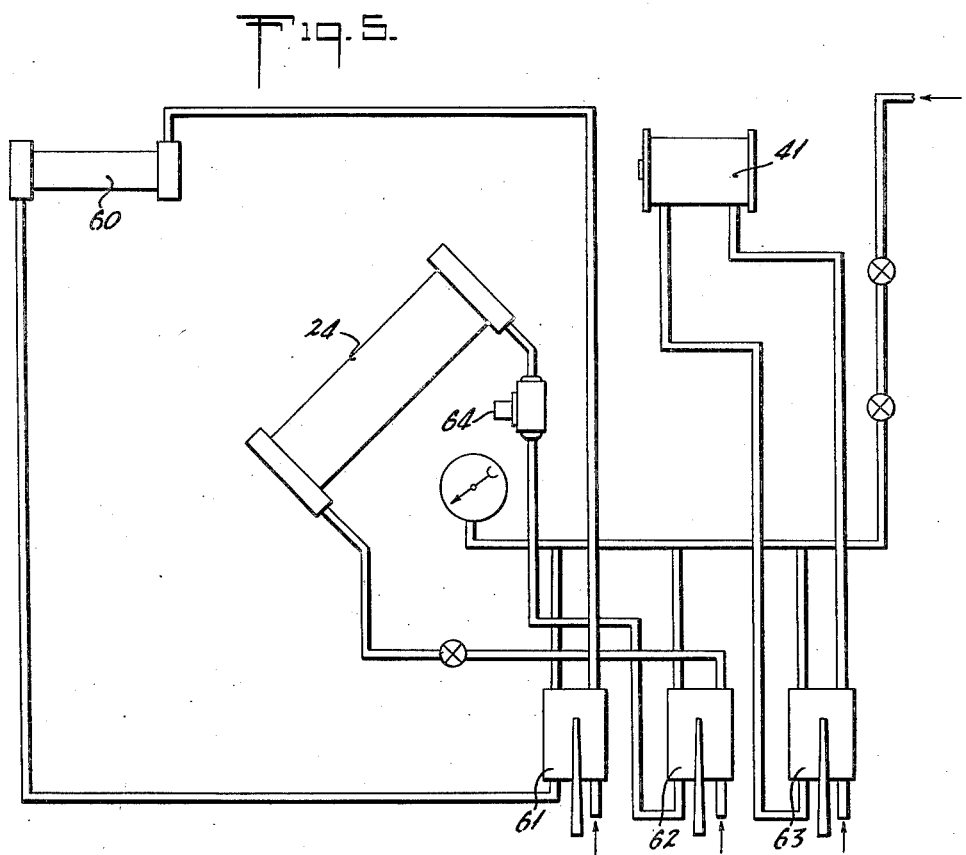
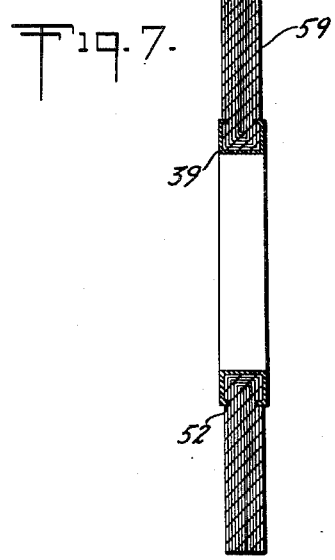
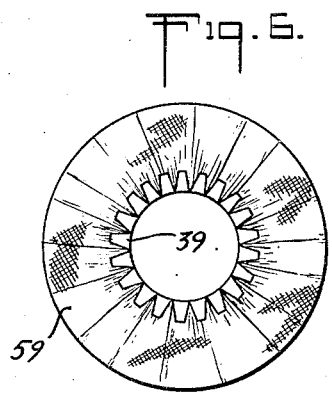

Sept. 1, 1953      L. W. MacFARLAND      2,650,861
MACHINE FOR THE MANUFACTURE OF BUFFS AND SIMILAR ARTICLES
Filed March 25, 1947      5 Sheets-Sheet 5
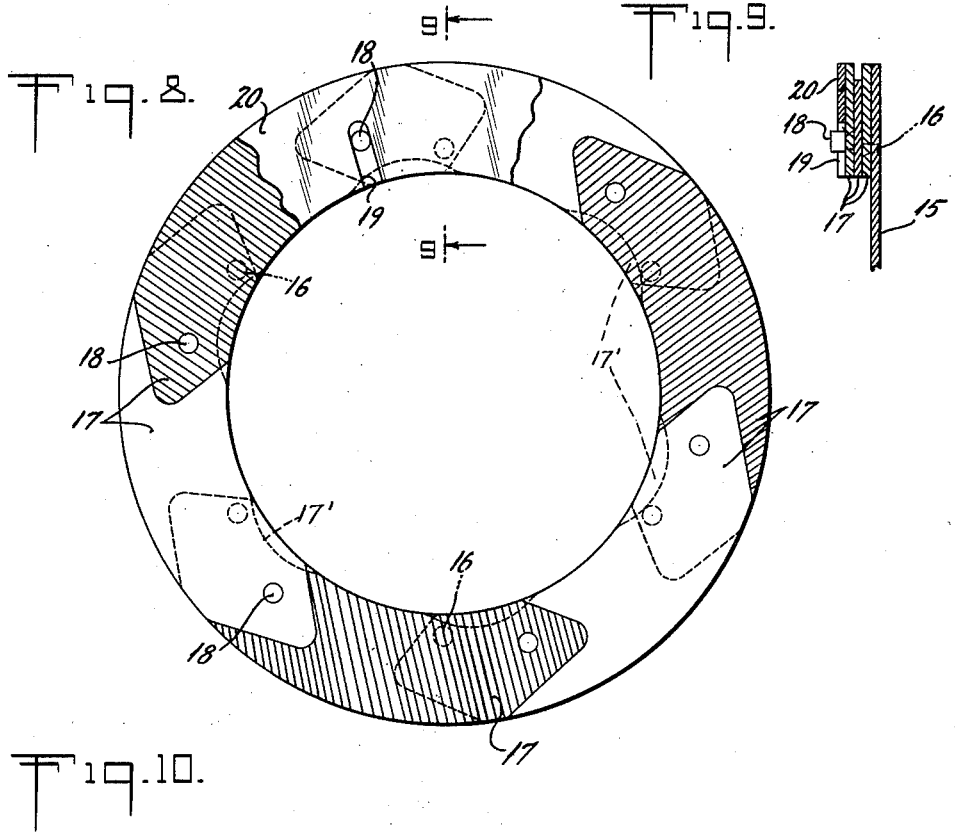
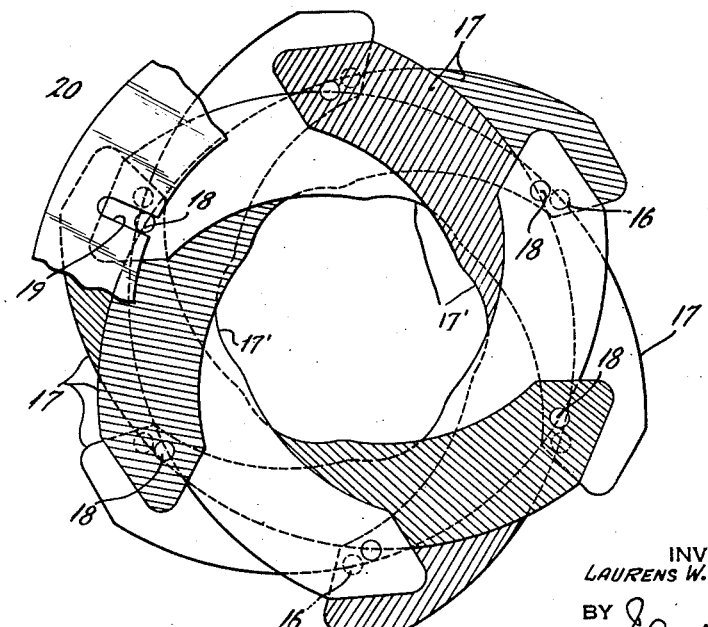
INVENTOR
LAURENS W. MacFARLAND
BY
ATTORNEY Patented Sept. 1, 1953

2,650,861

UNITED STATES PATENT OFFICE 2,650,861

MACHINE FOR THE MANUFACTURE OF BUFFS AND SIMILAR ARTICLES

Laurens W. MacFarland, Long Island City, N. Y., assignor to Jackson Buff Corporation, Long Island City, N. Y., a corporation of New York Application March 25, 1947, Serial No. 737,068

19 Claims. (Cl. 300—1)

This invention relates to a machine for the manufacture of rotary buffs, brushes, and other similar articles.

The invention relates primarily to the manufacture of buffs from strips of bias-cut fabric wound into cylindrical form, and consists in an improved apparatus for forming such buffs.

One object of the present invention is to contract cylindrically wound material by the pressure of rigid contracting blades and to clamp the folded portion at the internal periphery of the material.

A further object is to clamp the inner edge of an annular buff unit by means of a metallic ring having teeth for engaging the material of the buff while such material is held in place by the contractable internal blades.

Still another object of the invention is to assemble the strip of fabric in a multi-ply cylindrical form by winding the same upon a pair of spaced axially aligned drums which may remain stationary or may be advanced in an axial direction towards each other as a plurality of overlapping contractable blades are moved inwardly to collapse the cylinder of cloth along the center line of the strip, or midway between the ends of the cylindrical fabric structure.

Still another object is to form cylindrical brushes by assembling the bristles in a strip, by winding the strip upon cylinders or drums with the bristles running axially thereof, and by collapsing such strip by the action of said blades to dispose the bristles in radial directions.

With the above and other objects in view, the present invention consists in the novel method of operation and in the novel construction and arrangement of parts of the machine, illustrated in the accompanying drawings and particularly pointed out in the appended claims, it being understood that various changes may be made in the operation and in the construction without departing from the spirit of the invention or sacrificing any of the advantages thereof.

In the drawings Fig. 1 is a front view of the machine, Fig. 2 is an end view, Fig. 3 is an enlarged cross-section of the drum members, Fig. 4 is a detail section on the line 4—4 of Fig. 3, Fig. 5 is a diagram of the air pressure control mechanism, Fig. 6 is a side view of a buff unit and Fig. 7 is a cross-section thereof, Fig. 8 is a detail view showing the blades in retracted position, Fig. 9 is a cross-section of the line 9—9 of Fig. 8, and Fig. 10 is a view corresponding to Fig. 8 but showing the blades in a partly contracted position.

The drawings show one suitable form of the machine for the manufacture of annular buff units by collapsing the wound material from cylindrical form to substantially flat annular shape and the material may take the form of bias-cut fabric, paper or felt or the like, or of a strip composed of a row of bristles or wires, or the like, extending crosswise thereof, and retained in place on a backing strip or the equivalent thereof by stitching or by adhesive or in other suitable or convenient manner, or the strip may consist of suitable combinations of fabric, felt, paper, bristles and the like.

In the machine shown on the drawings a roll 10 of bias-cut fabric 59 is shown mounted on a removable reel 11 on a spindle 12 projecting from a bracket 13 on a carriage 14 which latter is so mounted that it may be moved freely into different operative and inoperative positions. The carriage 14 consists of an open plate or annulus 15 having six pivot pins 16 arranged equidistantly from each other and all at the same distance from the center of the annulus. Pivotally mounted on each pin 16 is a thin metal blade 17 whose opposite end is provided with a projecting stud 18 for engagement with a slot 19 in a ring 20, which latter has a pin 21 engaged by a head 22 on the end of a piston rod 23 having a joint 25. The piston on the rod 23 operates in a cylinder 24 suspended by a bracket 26 from the lower part of the carriage 14 so that fluid pressure admitted to the cylinder 24 actuates the pin 21 on the ring 20 and causes the latter to be displaced in an angular direction with respect to the annulus 15, so that the blades 17 which are disposed between the annulus 15 and the ring 20 and overlap each other are caused to turn on their pivots 16 while their studs 18 traverse the slots 19 in the ring 20 and the blades move inwardly until arcuate recesses 17' (Figs. 8 and 10) formed at their inner edges may form a substantially complete circle. The ring 20 is engaged on its outer side face by rollers 42 and on its outer periphery by rollers 27, these rollers 42, 27 being carried by the annulus 15 so that angular movement may be imparted to the ring 20 and movement thereof in other directions is prevented.

Carried on a part 43 of the frame 28 of the machine (Fig. 1), is a stationary hollow bracket 29 containing a central movable member 30 having a handle 31 and also having a projecting stud 32 which extends through an L-shaped slot 33 in the bracket 29 and the right-hand projecting end of the member 30 may extend through the ring 20 and annulus 15 and carries a drum member 35 arranged in axial alignment with a similar drum member 36 carried by a bracket 37 also mounted on the frame of the machine. The drum members 35, 36 may be removable and replaceable so that drums of different diameters and widths may be employed for the reception of strips of different widths and for the manufacture of buffing units of different external and/or internal diameters.

The drum member 36 is provided, see Fig. 3, with circular series of projections 38 to receive reinforcing and clamping rings 39 of different diameters while the opposed drum member 35 may be formed with annular grooves 40 to engage the projecting teeth of the clamping ring 39 and to deflect same outwardly and into the fabric of the buff. Connected to the drum member 36 is a cylinder 41 containing a piston having a piston rod 42 which latter extends through the drum member 36 and has a rectangular head 44 on its projecting end for cooperation with a key-hole slot 45 (Figs. 3 and 4) in the interior of the drum member 35 so that movement of the handle 31 towards the right advances the drum member 35 towards the drum member 36 and downward movement of the handle to cause the stud 32 to traverse. The offset part 34 of the slot 33 turns the key-hole slot 45 and locks the drum members together with a predetermined space therebetween. The handle 31, as shown at Fig. 2, is pivoted at 53 to a part 54 which is in turn pivoted at 55 to a fixed bracket 56, and the movable member 30 has an end piece 57 connected thereto and pivoted at 58 to the handle 31 so that both axial and angular movement may be imparted by the handle 31 to the member 30.

The free end of the strip 59 from the supply roll 10 is then attached to the drum members 35, 36 by means of clips 65 or in other suitable manner, and the drum members 35, 36 are then rotated by the electric motor 46, through the medium of the drive 47, sprocket drive 48, shaft 49 and sprocket drives 50, 51, see Figs. 1 and 2, until a predetermined number of revolutions have been made. The motor 46 is then stopped and the strip of fabric 59 is cut so as to separate the fabric on the drum members 35, 36 from the fabric on the supply roll 10. The carriage 14 is then advanced, by the admission of air to a cylinder 60, until the blades 17 are in alignment with the space between the drum members, and fluid pressure is then applied to the cylinder 24, to cause the blades 17 to move inwardly, to engage the fabric 59 wound on the drum members and to collapse the fabric into the space between the drum members and onto the outer surface of the clamping ring 39. Air pressure is then admitted to the cylinder 41 to actuate the piston therein and thereby draw the drum member 35 towards the drum member 36 so that the teeth 52 of the clamping ring are deflected and caused to penetrate the side faces of the annular buff. By the action of air pressure in the cylinder 24 the blades are then simultaneously retracted from the folded fabric and after such retraction further air pressure is applied to the cylinder 41 to cause a further compressing action upon the sides of the clamping ring 39.

During the inward movement of the blades 17 the opposed drum members preferably remain stationary, but alternatively the fabric may be wound upon the drum members while a substantial gap remains between their opposed faces and the drum members may be moved axially towards each other while the fabric is being collapsed by the blades. The drum members may be formed as permanent parts of the machine but they are preferably replaceable so that drum members of different diameters may be employed.

The dimensions of the drum members and the diameter of the clamping ring may be so chosen with relation to the width of the strip of fabric wound on the drum members that the width of the strip is exactly twice the dimension between the outer periphery of the clamping ring and the outer periphery of the drum members, but the width of the strip is preferably somewhat less than this so that the edges of the strip are drawn into the space between the drum members, and the edges of the fabric at the outer periphery of the buff are not quite straight but are puckered or shirred to a substantial extent.

In operation the machine is adjusted to suit both the external and internal diameters of the annular buff to be manufactured and a strip of bias-cut fabric 59 or other material having a width equal to twice the radial depth of the buff, Figs. 6 and 7, to be formed is mounted in the form of a supply roll 10 on the machine. The free outer end of the cloth 59 is then attached to the surface of the drum members in any suitable or convenient manner and power is applied by the motor 46 to rotate the drum members so as to draw the strip from the said roll 10 and to wind it to give the desired number of plies and when the winding is completed the cloth is severed and the carriage 14 is moved to the right in order to bring the contractable blades 17 into a plane midway between the drum members. Referring particularly to Fig. 5, three air control valves 61, 62 and 63 are provided, and actuation of valve 61 admits air to the cylinder 60 and causes the carriage to move as above described to bring the blades 17 into operative position and at the same time a safety valve 64 is actuated by the carriage 14 so that contraction of the blades is then permitted. By actuation of the valve 62, compressed air is then admitted to the cylinder 24 to cause the blades 17 to contract, each individual blade being pivoted at one of its ends while the opposite end swings in the manner above described. The blades thus contract the center line of the wound strip of fabric snugly around the metallic ring 39 previously placed on the studs 38 on the face of the drum member 36, and then by actuation of the third valve 63, air pressure is admitted to the cylinder 41 and pressure in an axial direction is thus applied to cause the teeth on the edges of the said ring 39 to engage the fabric on both sides of the annular buff thus formed. The blades 17 are then withdrawn outwardly to their normal position and by further actuation of said valve 63 air pressure is then applied to the cylinder 41 to give the final compression to the ring and to firmly seat the teeth in the material of the buff thus securely clamping the inner peripheral edge of the annular buff.

Although the drawings and the above specification disclose the best mode in which I have contemplated embodying my invention, I desire to be in no way limited to the details of such disclosure for in the further practical application of my invention many changes in constructional details may be made as circumstance requires or experience suggests without departing from the spirit of the invention within the scope of the appended claims.

What I claim is:

1. A machine for the manufacture of annular buffing units of the type described, comprising a pair of spaced and axially aligned drums, a clamping ring, a series of overlapping rigid blades, means for pivotally supporting each blade to form a ring of the overlapping blades around the space between the aligned drums, means for swinging the blades on their pivots to extend inwardly between said drums to collapse and shirr material wound on the surface of the drums, means for the application of pressure in an axial direction to cause the clamping ring to embrace the material of the annular buff unit at the inner periphery thereof, and means for withdrawing the said blades.

2. A machine for the manufacture of annular units of the type described from a strip of wound material, comprising a pair of spaced and axially aligned drums, means on one of the drums for carrying a toothed clamping ring with a diameter corresponding approximately to the internal diameter of said unit, means for locking the drums in properly spaced relation to each other, a series of overlapping pivoted blades, means for actuating the blades to move simultaneously between the opposed surfaces of the drums to collapse the wound material from the surface of the drums to the space therebetween and to bring the folded and shirred central edge of the strip of material into contact with the said clamping ring, means for applying pressure to said opposed surfaces to cause the ring to securely grip the internal edge of the annular unit, and means on at least one of the ring-engaging surfaces for deflecting the teeth of the said ring to turn the same inwardly into contact with the side face of the annular unit.

3. A machine for the manufacture of annular units of the type described from a strip of material, comprising a pair of spaced and axially aligned drums having a diameter corresponding approximately to the outer diameter of the annular unit, means on one of the drums for carrying a clamping ring with a diameter corresponding approximately to the internal diameter of said unit, a plurality of contractable overlapping rigid blades, arcuate surfaces on the internal edges of said blades conforming substantially to the curvature of the clamping ring, means for swinging the blades to contract them simultaneously to shirr and contract the material to engage the said clamping ring, and means for clinching the ring to enclose the inner peripheral edge of said unit.

4. A machine of the character described comprising a pair of drums mounted in axial alignment with each other, means on a side face of one of the drums for carrying a toothed, metallic clamping ring, an annular shaped face on the opposite drum in alignment with said ring to deflect the teeth of the ring into engagement with the unit, means for moving one of the drums in an axial direction to provide a predetermined space between the drums, means for rotating the drums to wind the material thereon, an annularly arranged series of overlapping blades for engaging the external surface of the wound strip along its center line, angularly movable means for swinging the blades to contract and shirr the material between the drums whereby said material engages the clamping ring, and means for applying pressure to the ring to enclose the inner peripheral edge of the unit.

5. A machine for the manufacture of annular units of the type described from a strip of wound material, comprising a pair of spaced and axially aligned drums, means on one of the drum for carrying a toothed clamping ring with a diameter corresponding approximately to the internal diameter of said unit, means for locking the drums in spaced relation to each other, a series of overlapping pivoted blades, air pressure means for actuating the blades to move simultaneously between the opposed surfaces of the drums to pull the wound material from the surface of the drums to the space therebetween and to bring the folded and shirred central edge of the strip of material into contact with the said clamping ring, air pressure means for engaging and pressing the side faces of the clamping ring to cause the teeth of the ring to securely grip the annular unit, and means on at least one of the ring-engaging members for deflecting the teeth to turn the same inwardly into contact with the side face of the annular unit.

6. A machine for the manufacture of annular units of the type described from a strip of material, comprising a pair of spaced and axially aligned drums having a diameter greater than the outer diameter of the annular unit, means on one of the drums for carrying a toothed clamping ring with a diameter corresponding approximately to the internal diameter of said unit, a plurality of contractable overlapping blades, arcuate surfaces on the internal edges of said blades conforming substantially to the curvature of the clamping ring, means for swinging the blades to retract them simultaneously to shirr and contract the material to engage the said clamping ring, and means for clinching the ring to enclose the inner peripheral edge of said unit and to cause the teeth of the ring to penetrate the buff near its inner periphery.

7. A machine of the character described comprising a pair of interchangeable drums mounted in axial alignment with each other, means on a side face of one of the drums for carrying a toothed, metallic clamping ring, an annular shaped face with a concave cross section on the opposite drum in alignment with said ring to deflect the teeth of the ring into engagement with the unit, means for moving one of the drums in an axial direction to provide a predetermined space between the drums, means for clipping the material to the drum, means for rotating the drums to wind the material thereon, an annularly arranged series of pivoted overlapping blades for engaging the external surface of the wound strip along its center line, means for swinging the blades inwardly to contract and shirr the material between the drums whereby said material engages the clamping ring, and means for applying side pressure to the ring to enclose the inner peripheral edge of the unit.

8. In a machine of the character described, means for pressing material from substantially cylindrical to substantially flat annular form comprising an annular group of flat pivoted overlapping blades, each having a recess at its inner edge conforming approximately to the curvature of the inner periphery of the annular material, an annular series of fixed pivots for the pivoted ends of the blades, an annular member having sliding connections with the opposite ends of the blades, means whereby each blade is swung inwardly to cause the central portion of the cylindrical material to be shirred and contracted to conform to the said recessed portions of the blades, means for applying axial pressure to the side faces of an annular clamping ring applied to said shirred part while internal pressure is exerted in an inward direction by the blades, and means for retracting the blades after said clamping operation.

9. A machine for the manufacture of annular units of the type described from a strip of material, comprising a pair of spaced and axially aligned drums having a diameter at least equal to the outer diameter of the unit to be formed, means on one of the drums for carrying a clamping ring with a diameter corresponding approximately to the internal diameter of said unit, means for locking the drums in spaced relation to each other, a carriage movable axially of the drums, a series of overlapping pivoted blades mounted on the carriage, pneumatic means for contracting the blades simultaneously between the opposed faces of the drums to collapse the wound material from the surface of the drums to the space therebetween and to bring the folded and shirred central edge of the strip of material into contact with the said clamping ring, and means for the application of pressure to cause the clamping ring to grip the internal folded and shirred edge of the annular unit.

10. A machine of the character described comprising a pair of interchangeable drums mounted in axial alignment with each other, means on the side face of one of the drums for carrying a toothed clamping ring, an annular shaped face on the other drum in alignment with said ring to turn the teeth of the ring into engagement with the unit, means for moving one of the drums in an axial direction to provide a predetermined space between it and the other drum, means for locking the drums in such position, clips for attaching the end of a strip of material to the surface of the aligned drums, means for rotating the drums to wind the material thereon, an annularly arranged series of overlapping blades for engaging the external surface of the wound strip along its center line, means for actuating the blades to contract and shirr the material between the drums and on to the said clamping ring, means for applying axial pressure to said ring to securely clamp the inner edge of the folded and shirred material, and means for separating the drums to permit removal of the finished unit.

11. In a machine of the character described, means for pressing material from substantially cylindrical to substantially flat annular form, comprising a ring member, a plurality of thin arcuate rigid blades each pivoted at one of its ends to said ring, such pivots being located at points equidistant from each other around the circumference of the ring and the blades being arranged in overlapping relation, a second ring, radial slots in the second ring, studs on the free ends of the blades engaging said slots whereby relative angular movement of said rings causes the overlapping blades to contract while similar movement in the opposite direction causes such blades to retract, drums for carrying the material in cylindrical form, means for rotating the drums to wind the material thereon, a carriage supporting said rings and blades, means whereby the carriage is caused to move axially of said drums, and fluid pressure means for imparting relative angular movement to said rings.

12. A machine for the manufacture of buffs, brushes and similar articles, comprising a pair of supports spaced from each other, means for winding a strip of flexible material upon the supports, a carriage movable with respect to said supports, a circular series of swinging and overlapping members on said carriage, fluid pressure means for simultaneously swinging said members inwardly between said supports to engage and contract the said flexible material, and fluid pressure means exerting axial side pressure on a binding ring carried between said spaced supports and applied externally to the contracted portion of said material before retraction of said swinging members.

13. A machine for the manufacture of buffs, brushes and similar articles, comprising a pair of supports spaced from each other, means for winding a strip of flexible material upon the supports, a carriage encircling and movable with respect to said supports, an annular series of overlapping blades spaced around the supports and pivoted to said carriage, rotary means for swinging one end of each blade to cause all the blades to simultaneously engage and contract the medial portion of said flexible material, and means for exerting side pressure upon a binding ring applied to said medial portion while held in the contracted position and for exerting further pressure after retraction of said blades.

14. A machine for the manufacture of buffs, brushes and similar articles, comprising a pair of supports spaced from each other, means for winding a strip of flexible material upon the supports, a series of rigid movable members arranged circumferentially and in overlapping relation to each other around the material wound upon the supports, fluid pressure means for moving the said rigid members inwardly to contract the medial portion of the material, means for gripping the said medial portion while still held in the contracted position by said rigid members, and means for exerting side pressure on said gripping means, both before and after the withdrawal of said contracting members.

15. In a machine of the character described, means for pressing material from substantially cylindrical to substantially flat annular form, comprising an annular group of overlapping blades having recessed portions of their inner edges conforming to the curvature of the inner periphery of the inner portion of the material in its flat annular form, a fixed pivot for one end of each blade, an annular member having a sliding connection with the opposite end of each blade, means for actuating said annular member whereby each blade is swung inwardly to cause the central portion of the cylindrical material to contract and conform to the said recessed portions of the blades, a clamping ring, means for clamping the inner periphery of the annular material by external pressure on said clamping ring while the blades exert internal pressure, and means for retracting the blades.

16. A machine for the manufacture of buffs, brushes and similar articles, comprising a pair of supports spaced from each other, means for winding a strip of flexible material upon the supports, a circular series of rigid members mounted around the supports in overlapping relation to each other, means for simultaneously swinging said members inwardly between the said supports to engage and contract the flexible material by displacing such material into the space between said supports, and fluid pressure means for exerting side pressure on a binding ring mounted between said spaced supports to retain the contracted inner periphery of the material after retraction of said rigid members.

17. A machine for the manufacture of buffs, brushes and similar articles, comprising a pair of supports spaced from each other, means for winding a strip of flexible material upon the supports, a series of overlapping blade members, a series of spaced pivots for said members, angularly movable means for swinging said members inwardly about their pivots to engage and uniformly contract the medial portion of said flexible material between said supports, and fluid pressure means exerting side pressure on a binding ring carried between the spaced supports and applied to said contracted medial portion before the withdrawal of the blade members.

18. A machine for the manufacture of annular buffing units of the type described, comprising a pair of spaced and axially aligned drums, a series of pivoted overlapping rigid blades forming an annulus around the drums, means for contracting the blades to extend inwardly between said drums to displace and convert into substantially flat form material wound upon said drums, means for externally applying a rigid ring for clamping the inner periphery of the annular material between said drums by external pressure applied thereto, and means for retracting the said blades.

19. A machine for the manufacture of annular buffing units of the type described, comprising a pair of spaced drums, a series of pivoted contractable blades forming an annulus around the space between the said drums, means for actuating the blades to extend inwardly between the drums to collapse and shirr material wound on the surface of the drums and to reduce the material to the form of an annular unit with an external diameter substantially less than that of the drums, mean for externally applying an inner ring for clamping the inner periphery of the annular unit while the material is still held internally by said blades, and means for retracting the blades from the unit.

LAURENS W. MacFARLAND.

References Cited in the file of this patent

UNITED STATES PATENTS

| Number | Name | Date |
|---|---|---|
| 911,413 | Latou | Feb. 2, 1909 |
| 1,514,715 | Nielsen | Nov. 11, 1924 |
| 1,548,898 | Nielsen | Aug. 11, 1925 |
| 1,749,802 | Culmer | Mar. 11, 1930 |
| 1,890,555 | Abraham | Dec. 13, 1932 |
| 1,922,108 | Meyers | Aug. 15, 1933 |
| 2,004,623 | Yohe | June 11, 1935 |
| 2,209,089 | Peterson | July 23, 1940 |
| 2,291,524 | Best | July 28, 1942 |